(12) United States Patent
Dutsky et al.

(10) Patent No.: US 10,317,302 B2
(45) Date of Patent: Jun. 11, 2019

(54) DUAL CHANNEL PRESSURE SENSOR WITH SINGLE CONNECTION ORIFICE

(71) Applicant: STEERING SOLUTIONS IP HOLDING CORPORATION, Saginaw, MI (US)

(72) Inventors: Jason A. Dutsky, Bay City, MI (US); Joel E. Birsching, Vassar, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 21 days.

(21) Appl. No.: 14/879,176

(22) Filed: Oct. 9, 2015

(65) Prior Publication Data

US 2016/0103034 A1    Apr. 14, 2016

Related U.S. Application Data

(60) Provisional application No. 62/062,216, filed on Oct. 10, 2014.

(51) Int. Cl.
  *G01L 19/14*    (2006.01)

(52) U.S. Cl.
  CPC .................................. *G01L 19/143* (2013.01)

(58) Field of Classification Search
  CPC ....... G01L 19/14; G01L 13/02; G01L 19/143; F15C 3/00
  USPC .......................................................... 73/756
  See application file for complete search history.

(56) References Cited

U.S. PATENT DOCUMENTS

| 2,964,948 | A | * | 12/1960 | La Coste | G01C 9/02 33/328 |
| 3,534,612 | A | * | 10/1970 | Buckland | G01L 9/0085 73/722 |
| 3,575,343 | A | * | 4/1971 | Kreuter | F15C 3/00 137/110 |
| 3,664,237 | A | * | 5/1972 | Paros | B23Q 1/34 73/441 |
| 3,747,042 | A | * | 7/1973 | Sheldon | G01L 13/028 338/42 |
| 4,370,890 | A | * | 2/1983 | Frick | G01L 13/025 361/283.4 |
| 5,337,612 | A | * | 8/1994 | Evans | G01L 19/0645 73/706 |

(Continued)

FOREIGN PATENT DOCUMENTS

| CN | 104792452 A | 7/2015 |
| CN | 104949791 A | 9/2015 |
| CN | 204666303 U | 9/2015 |

OTHER PUBLICATIONS

Chinese Office Action and Search Report from Chinese Application No. 2015108954417 dated Aug. 21, 2017, 7 pages.

(Continued)

*Primary Examiner* — Jonathan M Dunlap
*Assistant Examiner* — Octavia Hollington
(74) *Attorney, Agent, or Firm* — Cantor Colburn LLP

(57) ABSTRACT

A dual channel pressure sensor is provided. The pressure sensor includes a baseplate extending from a housing. The baseplate has a first end, a second end, and a body extending between the first end and the second end. The first end defining a first inlet port and the body defining a second inlet port.

18 Claims, 5 Drawing Sheets

(56) References Cited

U.S. PATENT DOCUMENTS

| | | | | |
|---|---|---|---|---|
| 6,981,421 B2* | 1/2006 | Palmer | ............... | G01L 9/0041 |
| | | | | 73/735 |
| 7,540,196 B2* | 6/2009 | Kurtz | ............... | G01L 13/025 |
| | | | | 73/714 |
| 8,024,976 B2* | 9/2011 | Kurtz | ............... | G01L 19/0038 |
| | | | | 73/713 |
| 8,752,433 B2* | 6/2014 | Hedtke | ............... | G01L 27/007 |
| | | | | 73/700 |

OTHER PUBLICATIONS

English Translation of Chinese Office Action from Chinese Application No. 2015108954417 dated Aug. 21, 2017, 4 pages.
English Translation of Chinese Search Report from Chinese Application No. 2015108954417 dated Aug. 21, 2017, 3 pages.

* cited by examiner

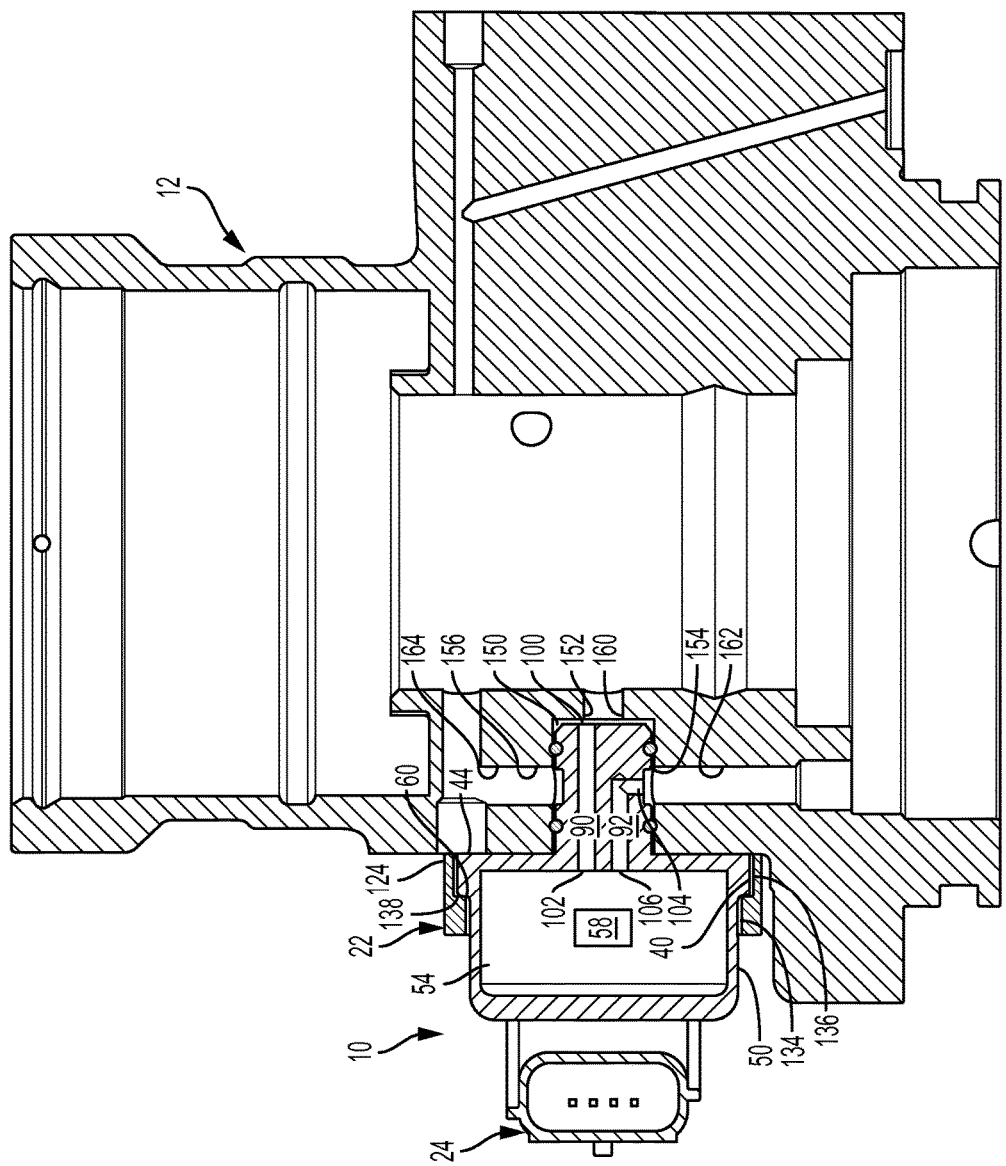

DUAL CHANNEL PRESSURE SENSOR WITH SINGLE CONNECTION ORIFICE

CROSS-REFERENCES TO RELATED APPLICATIONS

This patent application claims priority to U.S. Provisional Patent Application Ser. No. 62/062,216, filed Oct. 10, 2014 which is incorporated herein by reference in its entirety.

BACKGROUND OF THE INVENTION

A hydraulic steering system uses a pressure sensor to monitor the fluid pressure on opposing ends of a hydraulic piston. Currently available pressure sensors are designed to monitor only a single pressure channel, requiring the use of two individual sensors to monitor the opposing ends of the hydraulic piston along with two separate wiring harnesses. Space limitations within the hydraulic steering system and additional sealing locations of multiple pressure sensors present additional cost and durability concerns when using multiple pressure sensors.

SUMMARY OF THE INVENTION

In an embodiment of the invention, a pressure sensor is provided. The pressure sensor includes a housing and a baseplate. The housing has a first portion and a second portion that extends from the first portion. The second portion defines a chamber that receives pressure monitoring components. The baseplate extends from the first portion. The baseplate defines a first channel in communication with the chamber and a second channel spaced apart from the first channel in communication with the chamber.

In another embodiment of the invention, a dual channel pressure sensor is provided. The pressure sensor includes a baseplate extending from the housing. The baseplate has a first end, a second end, and a body extending between the first end and the second end. The first end defining a first inlet port and the body defining a second inlet port.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 is a partial section view of the first exemplary embodiment of the pressure sensor installed in a steering gear valve housing;

DETAILED DESCRIPTION

Referring now to the figures, where the invention will be described with reference to specific embodiments, without limiting same, however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
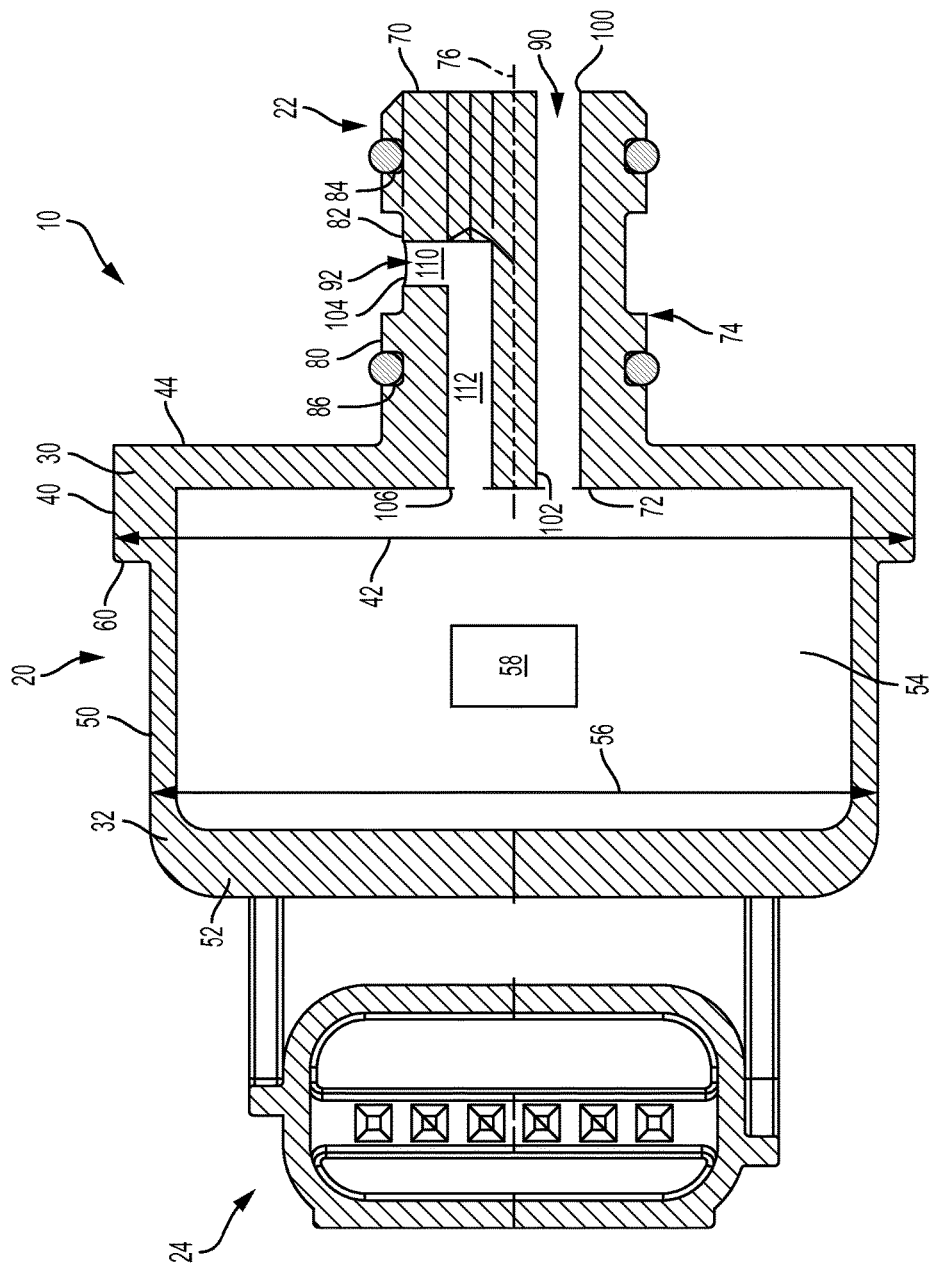
FIG. 1 is a partial section view of a first exemplary embodiment of a pressure sensor.

Referring to FIG. 1, a first exemplary pressure sensor 10 is shown. The first exemplary pressure sensor 10 is provided as part of a hydraulic steering system. The first exemplary pressure sensor 10 monitors the hydraulic fluid pressure of the working fluid on opposite ends of a hydraulic piston disposed within a steering gear valve housing 12. The first exemplary pressure sensor 10 provides data or a signal indicative of the hydraulic fluid pressure to a power steering control module or other vehicle module or interface.

The first exemplary pressure sensor 10 includes a housing 20, a baseplate 22, an electrical connector 24, and a retainer plate 26. The housing 20 includes a first portion 30 and a second portion 32. The first portion 30 has a first outer surface 40. The first outer surface 40 defines a first width or a first diameter 42. The first outer surface 40 extends from a flanged surface 44 towards the second portion 32.

The second portion 32 extends away from the first portion 30 in a first direction. The second portion 32 has a second outer surface 50 that extends from the first portion 30 towards a cap portion 52. The second portion 32 defines a chamber 54 that receives pressure monitoring components 58. The pressure monitoring components 58 are configured to or programmed to monitor the hydraulic fluid pressure and output data or a signal indicative of the hydraulic fluid pressure to the power steering control module.

The second outer surface 50 has a second diameter 56. The second diameter 56 is less than the first diameter 42. A ledge 60 extends between the first outer surface 40 and the second outer surface 50. The ledge 60 is disposed substantially perpendicular to the first outer surface 40 and the second outer surface 50.

The baseplate 22 extends away from the flanged surface 44 of the housing 20 in a second direction opposite the first direction. The baseplate 22 is disposed opposite the second portion 32 of the housing 20.

The baseplate 22 includes a first end 70, a second end 72, and an elongate body 74. The first end 70 is disposed opposite and spaced apart from the second end 72. The second end 72 is disposed proximate the flanged surface 44 of the first portion 30 of the housing 20. The elongate body 74 extends between the first end 70 and the second end 72 along an elongate body axis 76. The elongate body 74 defines an outer surface 80.

The outer surface 80 defines a recess 82. The recess 82 is spaced apart from and is disposed between the first end 70 and the second end 72. The outer surface 80 further defines a first sealing groove 84 and a second sealing groove 86. The first sealing groove 84 and the second sealing groove 86 are each configured to receive a sealing member such as an O-ring or the like. The first sealing groove 84 is spaced apart from and disposed between the first end 70 and the recess 82. The second sealing groove 86 is spaced apart from and disposed between the second end 72 and the recess 82 such that the recess 82 is disposed between the first sealing groove 84 and the second sealing groove 86.

The baseplate 22 defines a first channel 90 and a second channel 92 spaced apart from the first channel 90. The first channel 90 extends from a first inlet port 100 defined by or formed in the first end 70 to a first outlet port 102 defined by or formed in the second end 72. The first channel 90 is in communication with a first pressure sensing element of pressure monitoring components 58 located within the chamber 54 and is sealed from chamber 54 by the first pressure sensing element. The first channel 90 extends completely through the baseplate 22 in a substantially continuous segment.

The second channel 92 extends from a second inlet port 104 defined by or formed in the outer surface 80 of the elongate body 74 to a second outlet port 106 defined by or formed in the second end 72. The second inlet port 104 is disposed within the recess 82. The second channel 92 is in communication with a second pressure sensing element of pressure monitoring components 58 located within the chamber 54 and is sealed from chamber 54 by the second pressure sensing element.

The second channel 92 includes a first segment 110 and a second segment 112. The first segment 110 extends from the second inlet port 104 of the outer surface 80 of the elongate body 74 in a direction substantially parallel to the first end 70 and the second end 72. The first segment 110 is disposed substantially perpendicular to the second segment 112. The second segment 112 extends from an end of the first segment 110 towards the second outlet port 106 of the second end 72 in a direction substantially perpendicular to the first end 70 and the second end 72.

The electrical connector 24 extends from the cap portion 52 of the second portion 32 of the housing 20. The electrical connector 24 is in communication with the pressure monitoring components 58. The electrical connector 24 enables the first exemplary pressure sensor 10 to communicate the hydraulic fluid pressure data or signals to a power steering control module or other vehicle module or interface. The electrical connector 24 is a 90° connector that reduces the overall package length of the first exemplary pressure sensor 10.

Figure 2B:
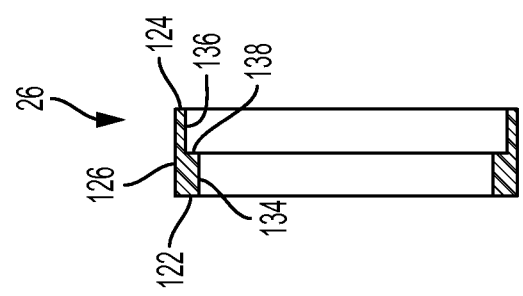
FIGS. 2A-2B are perspective views of a retainer plate.
Figure 2A:
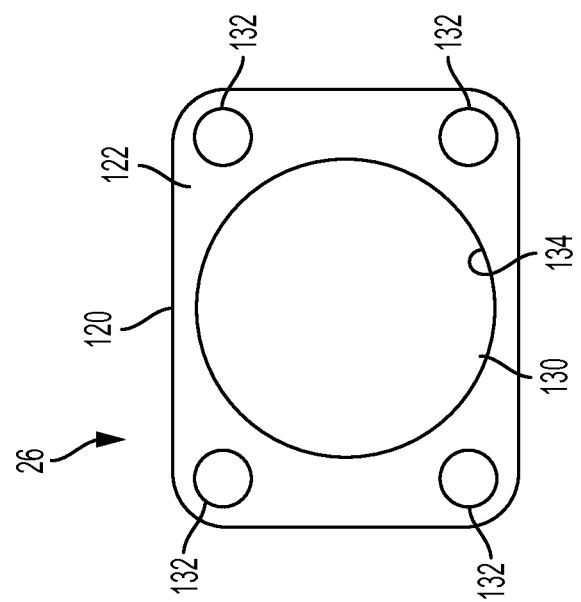

Referring to FIGS. 2A and 2B, the retainer plate 26 is shown. The retainer plate 26 is configured to facilitate mounting of the first exemplary pressure sensor 10 to a complementary component such as the steering gear valve housing 12. The retainer plate 26 includes a plate body 120 that has a first surface 122 disposed opposite a second surface 124 and a side surface 126 that extends between the first surface 122 and the second surface 124.

The plate body 120 defines a central opening 130 and multiple mounting holes 132 that extend from the first surface 122 to the second surface 124. The central opening 130 extends completely through the plate body 120. The central opening 130 is sized such that the second portion 32 of the housing 20 extends at least partially through the central opening 130. The multiple mounting holes 132 are spaced apart from the central opening 130 and are disposed about a periphery of the plate body 120.

The plate body 120 includes a first inner surface 134, a second inner surface 136, and a stepped surface 138. The first inner surface 134 is disposed proximate the first surface 122. The first inner surface 134 extends from the first surface 122 towards the second surface 124.

The second inner surface 136 is disposed proximate the second surface 124. The second inner surface 136 extends from the second surface 124 towards the first surface 122.

The stepped surface 138 extends from the first inner surface 134 to the second inner surface 136. The stepped surface 138 extends substantially perpendicular with respect to the first inner surface 134 and/or the second inner surface 136.

Referring to FIG. 3, the steering gear valve housing 12 defines an orifice 150. The orifice 150 includes a first port 152, a second port 154, and a third port 156. The first port 152 is in communication with a first conduit 160. The first port 152 and the first conduit 160 may extend along an axis disposed substantially parallel to the elongate body axis 76. The second port 154 is in communication with a second conduit 162. The second port 154 and the second conduit 162 may extend along an axis transverse to or perpendicular to the elongate body axis 76. The third port 156 is in communication with a third conduit 164. The third port 156 and the third conduit 164 may extend along an axis disposed transverse to or perpendicular to the elongate body axis 76. The second port 154 and the second conduit 162 are radially spaced apart from the third port 156 and the third conduit 164.

The orifice 150 is sized to receive the baseplate 22 of the first exemplary pressure sensor 10. The first inlet port 100 is proximately aligned with the first port 152. The second inlet port 104 is proximately aligned with the second port 154.

The retainer plate 26 is clamped over the first exemplary pressure sensor 10 to mount the first exemplary pressure sensor 10 to the steering gear valve housing 12. The second surface 124 engages a surface of the steering gear valve housing 12. The stepped surface 138 engages the ledge 60. The multiple mounting holes 132 are configured to receive fasteners to securely mount the retainer plate 26 and the first exemplary pressure sensor 10 to the steering gear valve housing 12.

Figure 4:
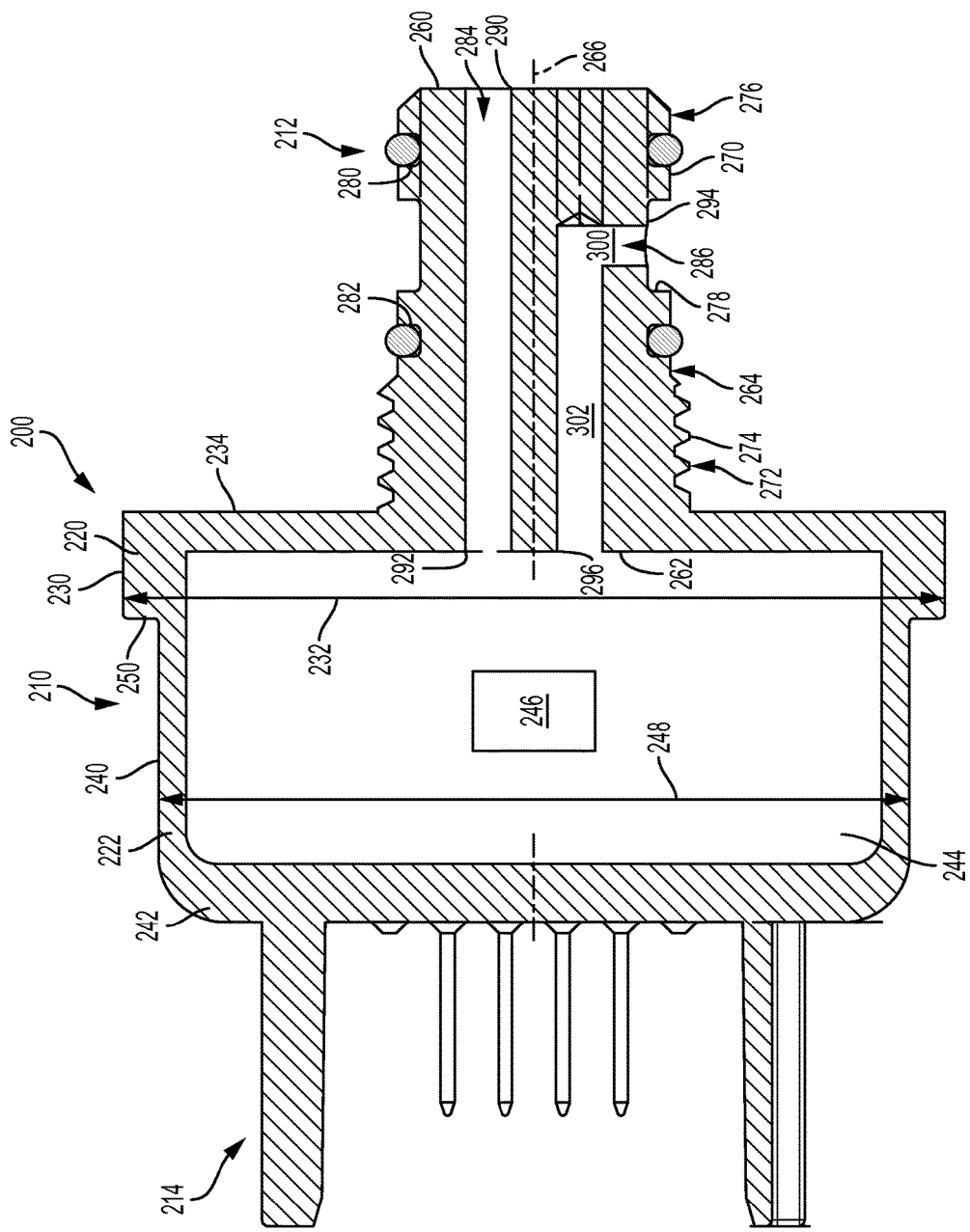
FIG. 4 is a partial section view of a second exemplary embodiment of a pressure sensor.
Figure 5:
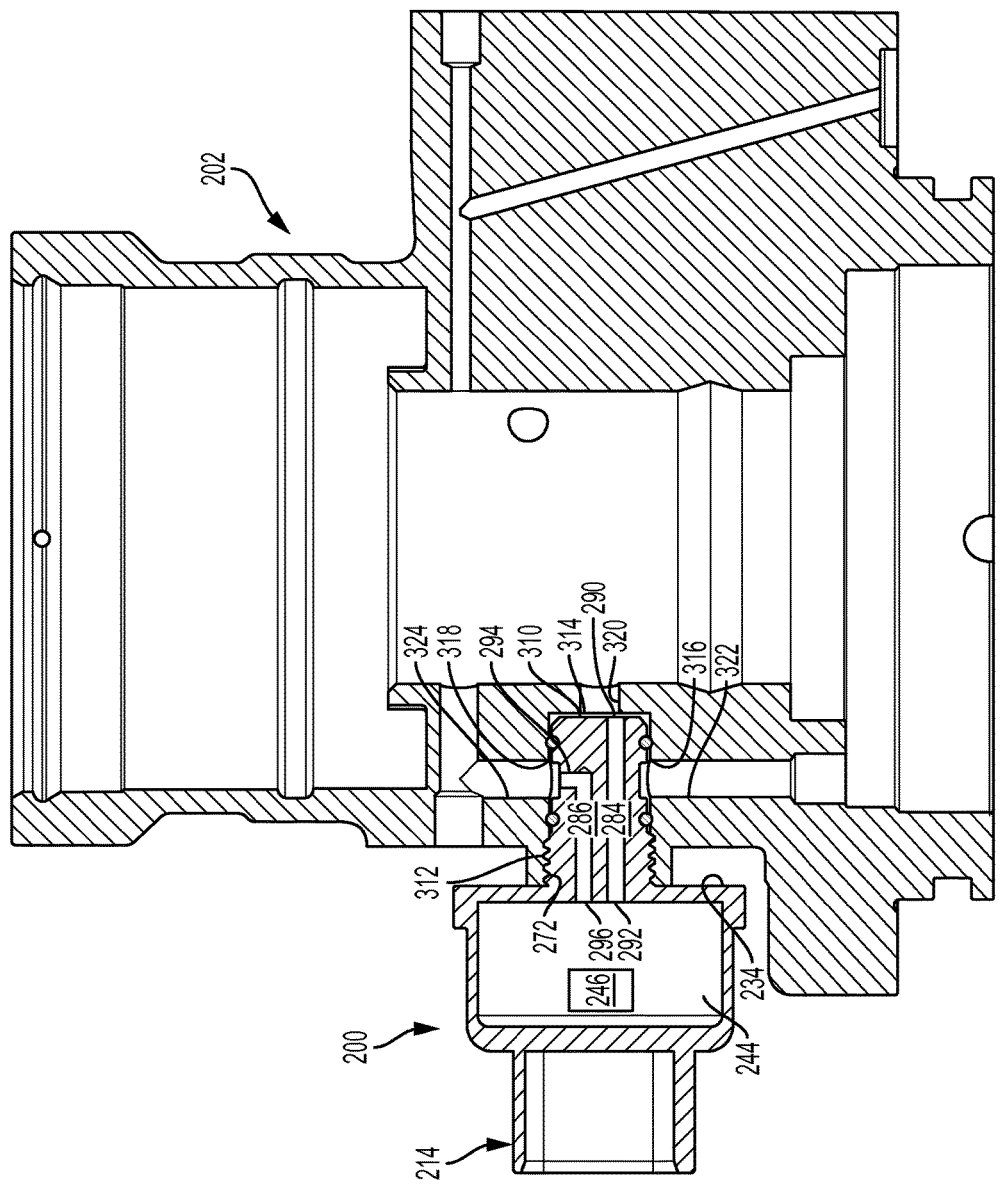
FIG. 5 is a partial sectional view of the second exemplary embodiment of the pressure sensor installed in a steering gear valve housing.

Referring to FIGS. 4 and 5, a second exemplary pressure sensor 200 is shown. The second exemplary pressure sensor 200 is provided as part of a hydraulic steering system. The second exemplary pressure sensor 200 monitors the hydraulic fluid pressure of the fluid on opposite ends of a hydraulic piston disposed within a steering gear valve housing 202 that provides steering assist to the vehicle driver.

The second exemplary pressure sensor 200 includes a housing 210, a baseplate 212, and an electrical connector 214. The housing 210 includes a first portion 220 and a second portion 222. The first portion 220 has a first outer surface 230. The first outer surface 230 defines a first width or a first diameter 232. The first outer surface 230 extends from a flanged surface 234 towards the second portion 222.

The second portion 222 extends away from the first portion 220 in a first direction. The second portion 222 has a second outer surface 240 that extends from the first portion 220 towards a cap portion 242. The second portion 222 defines a chamber 244 that receives pressure monitoring components 246. The pressure monitoring components 246 are configured to or programmed to monitor the hydraulic fluid pressure and output data or a signal indicative of the hydraulic fluid pressure.

The second outer surface 240 has a second diameter 248. The second diameter 248 is less than the first diameter 232. A ledge 250 extends between the first outer surface 230 and the second outer surface 240. The ledge 250 is disposed substantially perpendicular to the first outer surface 230 and the second outer surface 240.

The baseplate 212 extends away from the flanged surface 234 of the housing 210 in a second direction opposite the first direction. The baseplate 212 is disposed opposite the second portion 222 of the housing 210.

The baseplate 212 includes a first end 260, a second end 262, and an elongate body 264. The first end 260 is disposed opposite and spaced apart from the second end 262. The second end 262 is disposed proximate the flanged surface 234 of the first portion 220 of the housing 210. The elongate body 264 extends between the first end 260 and the second end 262 along an elongate body axis 266. The elongate body 264 defines an outer surface 270.

The outer surface 270 defines a threaded region 272 having a set of threads 274 and a non-threaded region 276. The threaded region 272 is disposed proximate the second end 262. The non-threaded region 276 is spaced apart from the threaded region 272 and is disposed proximate the first end 260.

The non-threaded region 276 defines a recess 278. The recess 278 is spaced apart from and is disposed between the first end 260 and the second end 262. The outer surface 270 further defines a first sealing groove 280 and a second sealing groove 282. The first sealing groove 280 and the second sealing groove 282 are each configured to receive a sealing member such as an O-ring or the like. The first sealing groove 280 is spaced apart from and disposed between the first end 260 and the recess 278. The second sealing groove 282 is spaced apart from and disposed between the second end 262 and the recess 278 such that the recess 278 is disposed between the first sealing groove 280 and the second sealing groove 282.

The baseplate 212 defines a first channel 284 and a second channel 286 spaced apart from the first channel 284. The first channel 284 extends from a first inlet port 290 defined by or formed in the first end 260 to a first outlet port 292 defined by or formed in the second end 262. The first channel 284 is in communication with a first pressure sensing element of pressure monitoring components 246 located within the chamber 244 and is sealed from chamber 244 by the first pressure sensing element. The first channel 284 extends completely through the elongate body 264 of the baseplate 212 in a substantially continuous segment.

The second channel 286 extends from a second inlet port 294 defined by or formed in the outer surface 270 of the elongate body 264 to a second outlet port 296 defined by or formed in the second end 262. The second inlet port 294 is disposed within the recess 278. The second channel 286 is in communication with a second pressure sensing element of pressure monitoring components 246 located within the chamber 244 and is sealed from the chamber 244 by the second pressure sensing element.

The second channel 286 includes a first segment 300 and a second segment 302. The first segment 300 extends from the second inlet port 294 of the outer surface 270 of the elongate body 264 in a direction substantially parallel to the first end 260 and the second end 262. The first segment 300 is disposed substantially perpendicular to the second segment 302. The second segment 302 extends from an end of the first segment 300 towards the second outlet port 296 of the second end 262 in a direction substantially perpendicular to the first end 260 and the second end 262.

The electrical connector 214 extends from the cap portion 242 of the second portion 222 of the housing 210. The electrical connector 214 is in communication with the pressure monitoring components 246. The electrical connector 214 enables the second exemplary pressure sensor 200 to communicate the hydraulic fluid pressure data or signals to a power steering control module or other vehicle module or interface. The electrical connector 214 is a straight connector that reduces the overall package length of the second exemplary pressure sensor 200.

Referring to FIG. 5, the steering gear valve housing 202 defines an orifice 310. The orifice 310 includes a threaded connection 312, a first port 314, a second port 316, and a third port 318. The threaded region 272 cooperates with the threaded connection 312 to threadedly receive the baseplate 212 to mount the second exemplary pressure sensor 200 to the steering gear valve housing 202.

The first port 314 is in communication with a first conduit 320. The first port 314 and the first conduit 320 may extend along an axis disposed substantially parallel to the elongate body axis 266. The second port 316 is in communication with a second conduit 322. The second port 316 and the second conduit 322 may extend along an axis transverse to or perpendicular to the elongate body axis 266. The third port 318 is in communication with a third conduit 324. The third port 318 and the third conduit 324 may extend along an axis disposed transverse to or perpendicular to the elongate body axis 266.

The second port 316 and the second conduit 322 are radially spaced apart from the third port 318 and the third conduit 324. The first inlet port 290 is proximately aligned with the first port 314. The second inlet port 294 is proximately aligned with the third port 318.

The dual channel pressure sensor with a single connection orifice enables the pressure sensor to monitor two pressure channels and enables the use of only one pressure sensor per steering gear assembly. The dual channel pressure sensor simplifies the overall machining of the steering gear valve housing with the machining of a single orifice to receive the dual channel pressure sensor. Additionally, retention of the dual channel pressure sensor by way of the retaining plate or the threaded connection reduces the stresses applied to the internal components of the pressure sensor and decouples the functions of retaining the pressure sensor and measuring the hydraulic fluid pressure. The reduction in stresses improves the performance and accuracy of the pressure sensor.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A pressure sensor comprising:
   a housing including
      a first portion, and
      a second portion that extends directly from the first portion, the second portion defining a chamber that receives pressure monitoring components, the first portion has a first outer surface and the second portion has a second outer surface and a ledge extends between the first outer surface and the second outer surface; and
   a baseplate extending from the first portion, the baseplate defining a first channel in fluid communication with the chamber and a second channel spaced apart from the first channel in fluid communication with the chamber.

2. The pressure sensor of claim 1, wherein the first portion has a first diameter and the second portion has a second diameter less than the first diameter.

3. The pressure sensor of claim 1, further comprising a retainer plate that engages the ledge to facilitate mounting of the housing onto a complementary component.

4. The pressure sensor of claim 3, the retainer plate having a plate body defining a central opening through which the second portion of the housing at least partially extends.

5. The pressure sensor of claim 3, the retainer plate having a plate body having a first surface disposed opposite a second surface and a side surface that extends between the first surface and the second surface.

6. The pressure sensor of claim 5, the plate body including a first inner surface disposed proximate the first surface, a second inner surface disposed proximate the second surface, and a stepped surface that extends between and is perpendicular to the first inner surface and the second inner surface.

7. The pressure sensor of claim 6, the first inner surface is disposed parallel to and proximate the second outer surface, the second inner surface is disposed parallel to and proximate the first outer surface, and the stepped surface is disposed parallel to and proximate the ledge.

8. The pressure sensor of claim 1, wherein the first channel extends from a first end of the baseplate to a second end of the baseplate.

9. The pressure sensor of claim 8, wherein the second channel extends from an outer surface of the baseplate to the second end of the baseplate.

10. The pressure sensor of claim 9, wherein the second channel has a first segment and a second segment, the first segment is disposed substantially perpendicular to the second segment.

11. The pressure sensor of claim 1, wherein an outer surface of the baseplate defines a recess.

12. The pressure sensor of claim 11, wherein the outer surface of the baseplate defines a first sealing groove spaced apart from the recess.

13. The pressure sensor of claim 12, wherein the outer surface of the baseplate defines a second sealing groove spaced apart from the recess, such that the recess is disposed between the first sealing groove and the second sealing groove.

14. A dual channel pressure sensor comprising:
a baseplate extending from a housing, the baseplate having a first end, a second end, and a body extending between the first end and the second end, the first end defining a first inlet port and the body defining a second inlet port that is disposed transverse to the first inlet port, the second end defines a first outlet port and a second outlet port, and the body defines a first channel extending between the first inlet port and the first outlet port and a second channel extending between the second inlet port and the second outlet port, the body has an outer surface that defines a threaded region that extends from the second end towards the first end and a non-threaded region that extends from the first end towards the second end, the non-threaded region defines a recess within which the second inlet port is defined.

15. The pressure sensor of claim 14, wherein the threaded region cooperates with a threaded connection of a steering gear housing to mount the housing to the steering gear housing.

16. The pressure sensor of claim 14, wherein the non-threaded region defines a sealing groove disposed between the recess and the threaded region, the sealing groove receives a sealing member.

17. The pressure sensor of claim 14, wherein the housing has a ledge that extends around the housing.

18. The pressure sensor of claim 14, further comprising an electrical connector extending from the housing, the electrical connector disposed opposite the baseplate.

\* \* \* \* \*